United States Patent
Bruneau

(10) Patent No.: US 10,590,591 B2
(45) Date of Patent: Mar. 17, 2020

(54) DUAL-CLAMPING-MODE CLIP FOR ARTICLES OF CLOTHING AND OTHER ITEMS

(71) Applicant: Mark L. Bruneau, Essex, VT (US)

(72) Inventor: Mark L. Bruneau, Essex, VT (US)

(*) Notice: Subject to any disclaimer, the term of this patent is extended or adjusted under 35 U.S.C. 154(b) by 0 days.

(21) Appl. No.: 15/819,827

(22) Filed: Nov. 21, 2017

(65) Prior Publication Data

US 2018/0142406 A1    May 24, 2018

Related U.S. Application Data

(60) Provisional application No. 62/425,450, filed on Nov. 22, 2016.

(51) Int. Cl.

| | | |
|---|---|---|
| *D06F 55/00* | (2006.01) | |
| *D06F 95/00* | (2006.01) | |
| *F16B 2/00* | (2006.01) | |
| *F16B 2/22* | (2006.01) | |

(52) U.S. Cl.
CPC ............ *D06F 55/00* (2013.01); *D06F 95/008* (2013.01); *F16B 2/22* (2013.01); *F16B 2/005* (2013.01)

(58) Field of Classification Search
CPC ...... C12Q 1/689; C07K 14/24; C07K 14/315; D06F 55/00; D06F 95/008; F16B 2/005; F16B 2/22
See application file for complete search history.

(56) References Cited

U.S. PATENT DOCUMENTS

| | | | | |
|---|---|---|---|---|
| 2,461,333 A | * | 2/1949 | Maccaferri | D06F 55/00 24/501 |
| 2,496,109 A | * | 1/1950 | Terry | D06F 55/00 24/530 |
| 2,976,593 A | * | 3/1961 | Exton | D06F 55/00 211/119.12 |
| 3,137,027 A | * | 6/1964 | Birkle | A47H 13/01 16/87.2 |
| D199,310 S | * | 10/1964 | Rizzuto | 24/562 |
| 3,462,809 A | * | 8/1969 | Froehlich, Jr. | A44B 99/00 24/562 |
| 3,733,656 A | * | 5/1973 | Stalder | D06F 55/00 24/557 |
| 3,797,076 A | * | 3/1974 | Watkin | A44B 99/00 24/562 |

(Continued)

*Primary Examiner* — Robert Sandy
*Assistant Examiner* — David M Upchurch
(74) *Attorney, Agent, or Firm* — Downs Rachlin Martin PLLC

(57) ABSTRACT

A dual-clamping-mode clip having a pair of opposing jaw spaced apart from one another for receiving one or more articles or portion(s) thereof. The dual-clamping-mode clip is designed to work by pinching action and/or by scissor action depending on characteristics of the article(s) and/or portion(s) thereof being held by the clip. Some embodiments of the dual-clamping-mode clip has a material relief region to assist in holding the one or more articles or portion(s) thereof. Some embodiments of the dual-clamping-mode clip have clothesline gripping provisions to allow the clip to be used as a clothespin. Some embodiments of the dual-clamping-mode clip include macro gripping features and/or micro gripping features to assist with holding the one or more articles or portion(s) thereof. Other useful features and characteristics are disclosed.

27 Claims, 5 Drawing Sheets

(56) References Cited

U.S. PATENT DOCUMENTS

| | | | | |
|---|---|---|---|---|
| 3,896,527 | A * | 7/1975 | Miller | A44B 99/00 16/DIG. 13 |
| 3,962,758 | A * | 6/1976 | Knappe | B65D 85/182 24/562 |
| 4,170,299 | A * | 10/1979 | Clements | A44B 99/00 206/342 |
| 4,170,995 | A * | 10/1979 | Levine | A61M 25/02 128/DIG. 26 |
| 4,335,838 | A * | 6/1982 | Bisk | A47G 25/32 211/115 |
| 4,534,089 | A * | 8/1985 | Swan | B42F 1/10 24/30.5 P |
| 4,763,390 | A * | 8/1988 | Rooz | A47G 25/485 223/93 |
| 5,159,730 | A * | 11/1992 | Radvin | A44B 99/00 24/543 |
| 5,245,715 | A * | 9/1993 | Dinkins | E04H 15/62 135/118 |
| 5,388,313 | A * | 2/1995 | Cameron | A41F 3/04 24/265 EC |
| 5,495,644 | A * | 3/1996 | Mesher | B42D 15/045 24/16 R |
| 5,546,641 | A * | 8/1996 | Radvin | A41F 19/005 24/557 |
| 5,970,586 | A * | 10/1999 | Demel | F16B 5/121 24/541 |
| 6,397,439 | B1 * | 6/2002 | Langford | D06F 55/00 24/499 |
| 6,842,951 | B1 * | 1/2005 | Barre | B25B 7/00 24/499 |
| 7,308,739 | B2 * | 12/2007 | Andersen | A44B 99/00 24/535 |
| 7,678,148 | B2 * | 3/2010 | Peterman | A61F 2/4455 623/17.11 |
| 8,061,070 | B2 * | 11/2011 | Chamandy | G09F 3/20 24/341 |
| 8,992,571 | B2 * | 3/2015 | Milazzo | A61B 17/0487 606/232 |
| 2012/0028534 | A1 * | 2/2012 | Unger | F16B 2/22 446/111 |
| 2013/0086773 | A1 * | 4/2013 | Cude | A61M 39/08 24/132 R |

\* cited by examiner

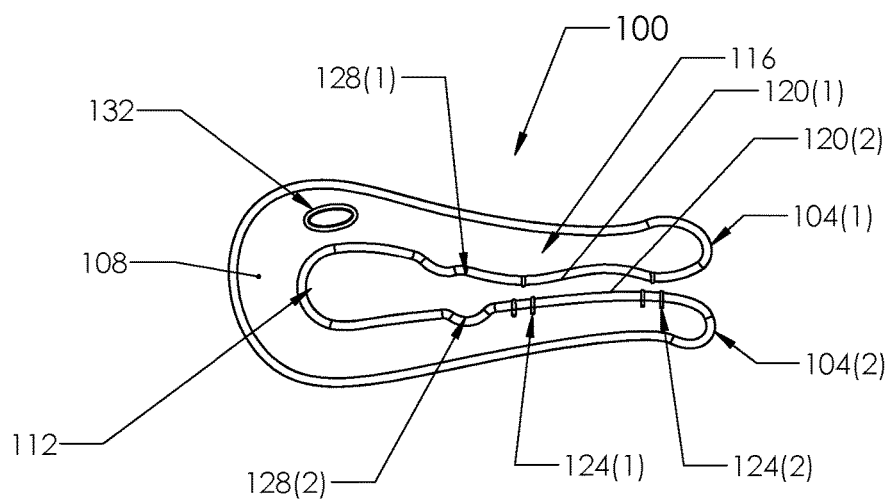
FIG. 1
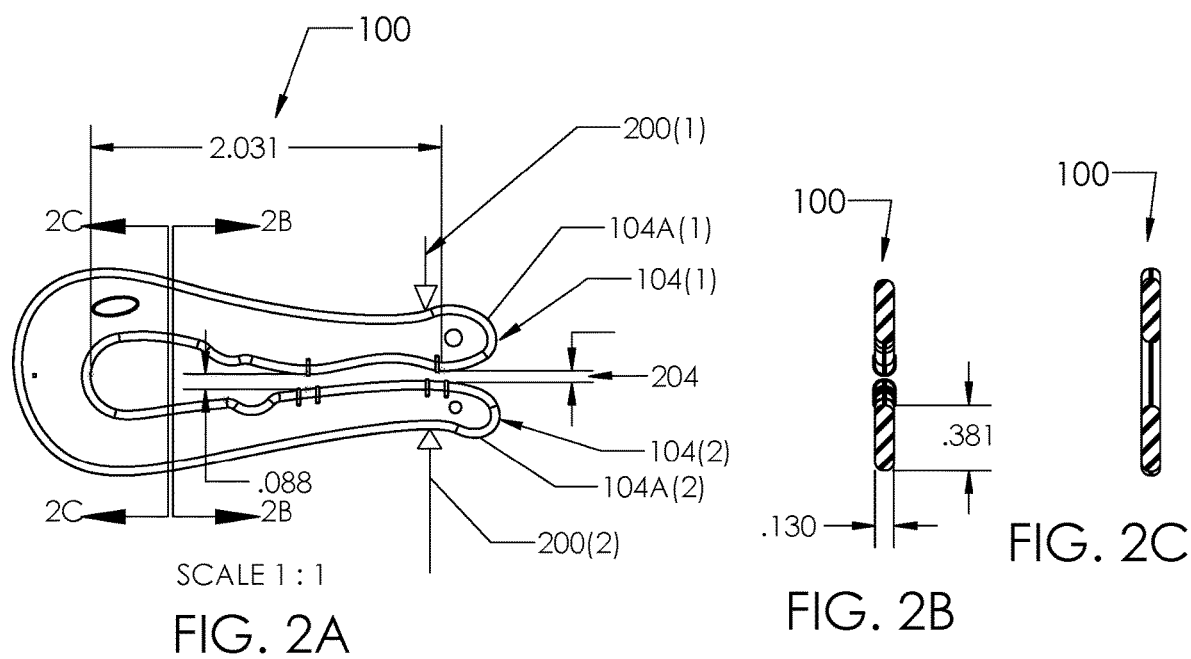
FIG. 2A
FIG. 2B
FIG. 2C

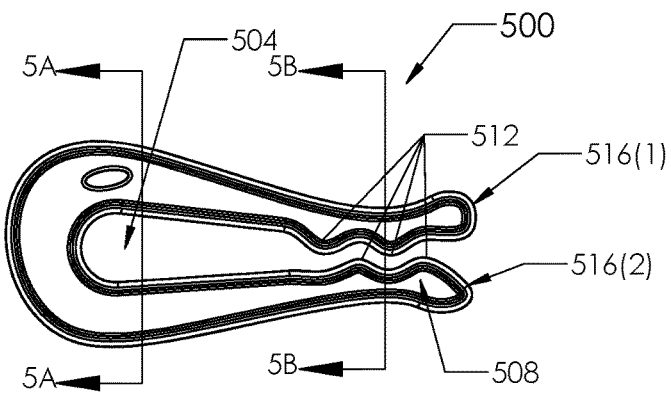
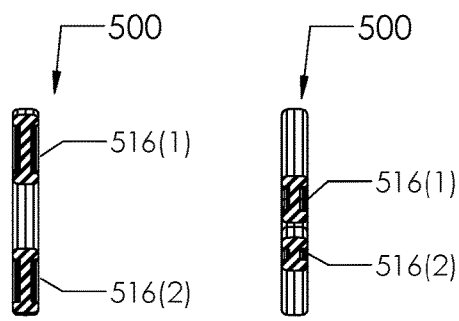
FIG. 5A
FIG. 5B FIG. 5C
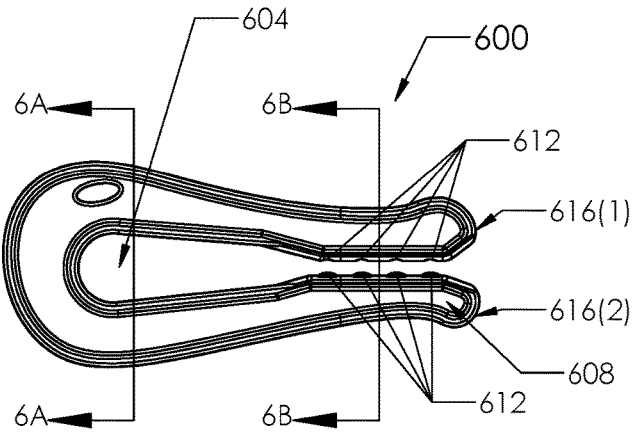
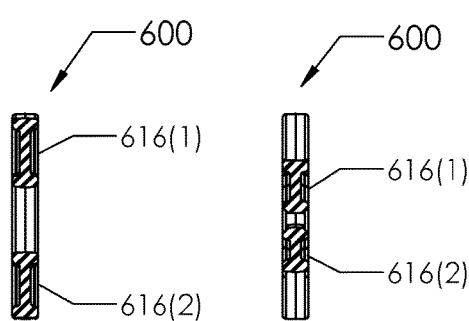
FIG. 6B FIG. 6C
FIG. 6A
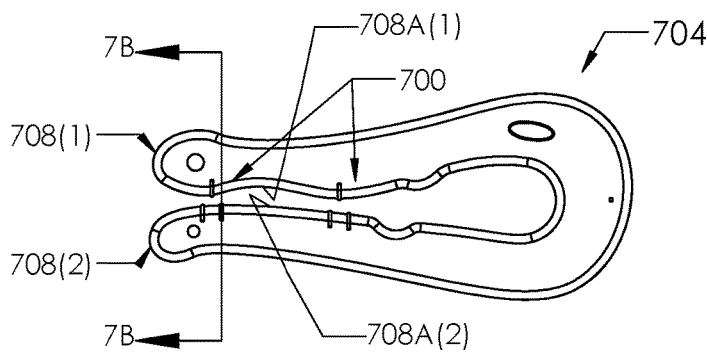
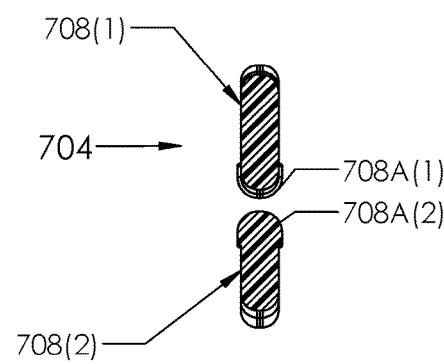
FIG. 7A
FIG. 7B

DUAL-CLAMPING-MODE CLIP FOR ARTICLES OF CLOTHING AND OTHER ITEMS

RELATED APPLICATION DATA

This application claims the benefit of priority of U.S. Provisional Patent Application Ser. No. 62/425,450, filed Nov. 22, 2016, and titled "DUAL-CLAMPING-MODE CLIP FOR ARTICLES OF CLOTHING AND OTHER ITEMS", which is incorporated by reference herein in its entirety.

FIELD OF THE INVENTION

The present invention generally relates to the field of clips for holding layers in place. In particular, the present invention is directed to a dual-clamping-mode clips for articles of clothing and other items.

BACKGROUND

A variety of clips exist for holding socks and other clothing articles together, as well as for holding a stack of layers of another item in place, such as a stack of layers created by folding an open end of a food bag to close/seal the bag, among other things. Many of these clips suffer from one or more of the following: being overly complex in terms of number of parts; being flimsy and "cheap;" being effective for only for a subset of the item(s) for which designed (e.g., socks of only a small range of thickness); being difficult to use; and/or having a design that tends to damage the item(s) at issue.

SUMMARY OF THE DISCLOSURE

In one exemplary embodiment of the invention, a clip for clamping together a stack of multiple layers. The clip includes a body generally having a U shape and that includes a first and second elongate jaws forming legs of the U-shape, each of the first and second jaws having first and second lateral sides; a confronting face extending from the first lateral side to the second lateral side, the confronting face confronting a like confronting face on the other of the first and second elongate jaws; and a clamping region, wherein the clamping regions of the corresponding respective first and second elongate jaws are designed and configured to simultaneously contact corresponding opposing outer faces of the multiple layers so as to clamp the multiple layers together, each clamping region having a clamping surface on at least a portion of the confronting face and extending onto one, the other, or both, of the first and second lateral sides; and a crotch portion joining together the first and second elongate jaws and located distal from the clamping regions of the first and second elongate jaws so as to form a base of the U shape; wherein the clip is designed and configured to accommodate differing stack thicknesses by the first and second elongate jaws deflecting via substantially only a scissor action.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a side view of an example dual-clamping-mode clip made in accordance with aspects of the present invention;

FIG. 2A is a reduced-size side view of the dual-clamping-mode clip of FIG. 1, illustrating aspects of pinching action of the dual-clamping-mode clip;

FIG. 2B is a cross-sectional view as taken along line 2B-2B of FIG. 2A;

FIG. 2C is a cross-sectional view as taken along line 2C-2C of FIG. 2A;

FIG. 5A is a side view of an example dual-clamping-mode clip of the present disclosure, illustrating alternative macro gripping features;

FIG. 5B is a cross-sectional view as taken along line 5B-5B of FIG. 5A;

FIG. 5C is a cross-sectional view as taken along line 5C-5C of FIG. 5A;

FIG. 6A is a side view of an example dual-clamping-mode clip of the present disclosure, illustrating other alternative macro gripping features;

FIG. 6B is a cross-sectional view as taken along line 6B-6B of FIG. 6A;

FIG. 6C is a cross-sectional view as taken along line 6C-6C of FIG. 6A;

FIG. 7A is a reduced side view of the dual-clamping-mode clip of FIG. 1, further illustrating the micro gripping features;

FIG. 7B is a cross-sectional view as taken along line 7B-7B of FIG. 7A;

DETAILED DESCRIPTION

Figure 3A:
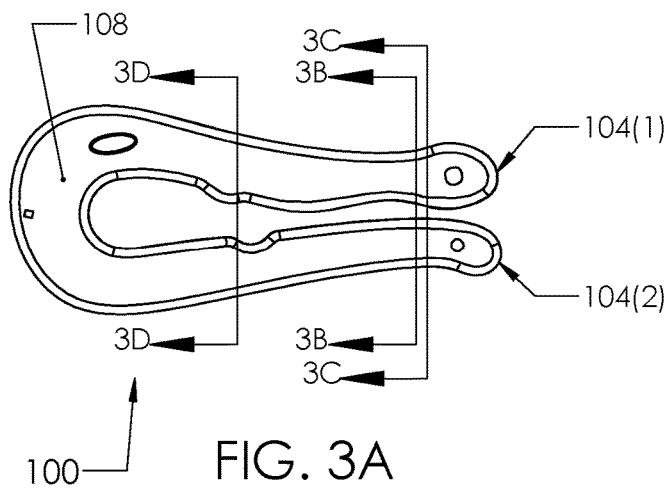
FIG. 3A is a reduced-size side view of the dual-clamping-mode clip of FIG. 1, illustrating aspects of scissor action of the dual-clamping-mode clip.

In one aspect, the present disclosure is directed to a dual-clamping-mode clip designed and configured to hold multiple layers and/or multiple articles together, such as layers of a folded food bag (e.g., snack-food bag, frozen-food bag, etc.) and a pair of socks, respectively. When a dual-clamping-mode clip of the present disclosure is configured and used as a laundry clip, such as a sock clip, one use of the dual-clamping-mode clip is to hold a pair of clothing articles (e.g., a matched pair of socks) together during laundering, i.e., washing and drying, so as to aid the user in keeping the articles together. If a dual-clamping-mode clip of the present disclosure is so configured, it can also or alternatively be used to hang one or more articles on a clothes line or similarly configured support. It is noted that a laundry-style dual-clamping-mode clip of the present disclosure need not only be used during laundering. Rather, it can be used at all times that the wearer is not wearing the clothing. For example, a dual-clamping-mode clip can be installed onto the articles of clothing just after wearing prior to being placed in the laundry, kept on through laundering, and even kept on during storage of the clothing until the next wearing. When a dual-clamping-mode clip of the present disclosure is configured and used as a bag clip, a user can fold and/or gather portions of the bag at an open end of the bag to close/seal the bag and then apply the dual-clamping-mode clip to hold the folded and/or gathered portion in place to maintain the seal. These and other uses of a dual-clamping-mode clip of the present disclosure will be understood by those skilled in the art.

As described in detail below and as illustrated in the accompanying drawings, features of a dual-clamping-mode clip of the present disclosure can include one or more of the following features: 1) jaws that hold the layers/articles by either pinching action or scissor action depending on the overall thickness being clamped; 2) scissor action effected by either beam bending in the jaws, torsion in a crotch region that joins the jaws, or a combination of both; 3) a material relief area, between the jaws proximate to the crotch region, that improves the functioning of the dual-clamping-mode clip; 4) a clamping region located distally from the crotch region; 5) one or more micro-grip regions within the clamping region; 6) one or more macro-grip regions within the clamping region; 7) one or more clothes-line features that allow the dual-clamping-mode clip to function as a clothes pin; and 8) holding features in one or more of the micro-grip and macro-grip regions. These and other features and aspects of a dual-clamping-mode clip of the present disclosure are described below and/or illustrated in the appended drawings.

Referring now to the drawings, FIG. 1 illustrates an example dual-clamping-mode clip 100 designed and configured for holding one or more articles of clothing (not shown), such as pairs of socks, or portions thereof, together during laundering of the article(s). Features of this embodiment include a pair of spaced-apart jaws 104(1) and 104(2) and a crotch region 108. In this example, jaws 104(1) and 104(2) are part of a unitary body and may be considered to be joined to one another at crotch region 108 and are shaped so as to form a material-relief region 112, which can be described as being enclosed on three sides by portions of dual-clamping-mode clip 100 generally in proximity to the crotch region. Material relief region 112 can aid in allowing dual-clamping-mode clip 100 to accommodate relatively thick articles so as to force the holding action to occur at a clamping region 116 distal from crotch region 108. One can envision that if relatively large material relief region 112 were not present and jaws 104(1) and 104(2) were spaced apart in that region by only the same amount as in clamping region 116, the relatively high stiffness of the jaws in the material relief region due to its close proximity to crotch region 108 would inhibit thick articles from being fully inserted into dual-clamping-mode clip 100 and would correspondingly inhibit the scissor action of the dual-clamping-mode clip.

In the example embodiment of FIG. 1, dual-clamping-mode clip 100 also includes macro-gripping areas 120(1) and 120(2) for gripping the article(s) at a macro-scale, as well as micro-gripping regions 124(1) and 124(2) for gripping the article(s) at a smaller scale. In some instantiations, one, the other, or both of micro-gripping regions 124(1) and 124(2) may include one or more gripping features, such as physical interference structures (e.g., embossments, ridges, teeth, etc.), high friction material(s) (e.g., certain soft and intermediate-hardness elastomers), and compressible material(s) (e.g., foam rubber and other resilient foams and materials), among others, and any combinations thereof. In the embodiment shown, dual-clamping-mode clip 100 also includes optional clothesline gripping provisions 128(1) and 128(2) that allow the dual-clamping-mode clip to also function as a clothespin for securing one or more articles to a clothesline (not shown) or similar structure. Also in this example, dual-clamping-mode clip 100 also includes and optional opening 132, which can be useful when the dual-clamping-mode clip is used as a clothes clip and placed into a clothes-washing machine. Wash-fluid opening 132 allows a wash fluid (e.g., a water+detergent mix) to flow through dual-clamping-mode clip 100 to make the dual-clamping-mode clip perform better hydrodynamically. In some embodiments, a dual-clamping-mode clip of the present disclosure may include more than one wash-fluid opening and in others may not have any wash-fluid openings.

FIGS. 2A to 2C illustrate not only example dimensions (in inches) for an instantiation of dual-clamping-mode clip 100 of FIG. 1, but also the phenomenon of pinching action in the context of a dual-clamping-mode clip of the present disclosure. As indicated by arrows 200(1) and 200(2), "pinching action," as used in the present disclosure and appended claims, is the holding action that works only in the vertical direction (relative to FIG. 2A) such that jaws 104(1) and 104(2) act only in beam bending about their major axes and no torsion is induced into crotch region 108. In one example, the minimum gap 204 toward the leading ends 104A(1) and 104A(2) of jaws 104(1) and 104(2) is 0.062 inches, so pinching action starts when the thickness of the article(s) exceeds this gap. As those skilled in the art will readily appreciate after reading and understanding this entire disclosure, a dual-clamping-mode clip of the present disclosure, such as dual-clamping-mode clip 100, will typically work only by pinching action when the compressed thickness of the article(s) between the jaws of the clip is generally no greater than the minimum spacing, here, minimum gap 204, between jaws 104(1) and 104(2).

Figure 3B:
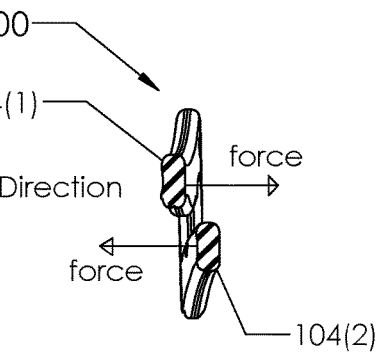
FIG. 3B is a cross-sectional view as taken along line 3B-3B of FIG. 3A, showing the jaws displaced in scissor action.
Figure 3C:
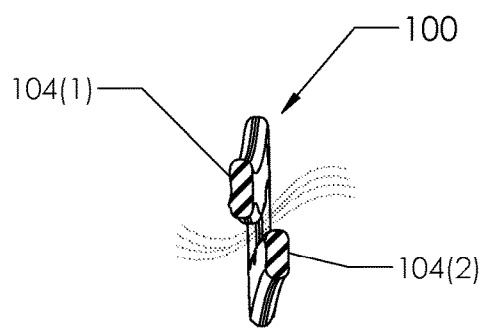
FIG. 3C is the cross-sectional view of FIG. 3B, further including a stack of layers between the jaws.
Figure 3D:
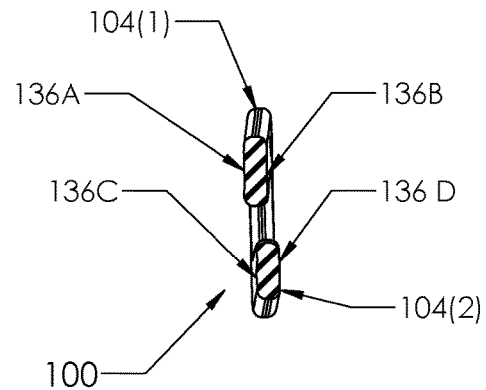
FIG. 3D is a cross-sectional view as taken along line 3D-3D of FIG. 3A, showing the jaws displaced in scissor action.

In contrast, FIGS. 3A to 3D illustrate, relative to example dual-clamping-mode clip 100, the phenomenon of scissor action in the context of a dual-clamping-mode clip of the present disclosure. As seen in FIGS. 3B to 3D, "scissor action" of a dual-clamping-mode clip of the present disclosure, such as dual-clamping-mode clip 100, involves jaws 104(1) and 104(2) moving laterally relative to one another, with the relatively large stiffness of the jaws in the planes of the jaws largely inhibiting further deflection in the pinching-action direction (see FIGS. 2A to 2C). In this embodiment, the scissor action is caused by a combination of torsion at crotch region 108 and beam bending of jaws 104(1) and 104(2) about their minor (e.g. "weaker") bending axis. In other embodiments, crotch region 108 can be torsionally rigid such that the scissor action is primarily from jaws 104(1) and 104(2) in about their weak bending axes.

As those skilled in the art will also readily understand, a dual-clamping-mode clip of the present disclosure will work by scissor action when the compressed thickness of the article(s) between the jaws (here, jaws 104(1) and 104(2) of the dual-clamping-mode clip (here, dual-clamping-mode clip 100) is greater than the minimum spacing (e.g., minimum gap 204 (FIG. 2A) between the jaws. In some embodiments, such as dual-clamping-mode clip 100 shown, the direction of the scissor action can be active in two directions so that opposing face paris engage in the scissor action. In this example, faces 136A and 136D work together in scissor action in one direction, and faces 136B and 136D work together in scissor action in the opposite direction. Some embodiments may be configured to work in scissor action in only one direction or the other. In one example, the ratio of the minimum dimension of each jaw 104(1), 104(2) along its weak bending axis (i.e., in its strong-axis direction (or height in FIG. 3A)) is two to three time the maximum dimension parallel to its strong bending axis (i.e., in its weak-axis direction (or width into the page of FIG. 3A)). However, it is noted that the particular dimensional relationship between jaw height and jaw width is simply illustrative and non-limiting.

Figure 4:
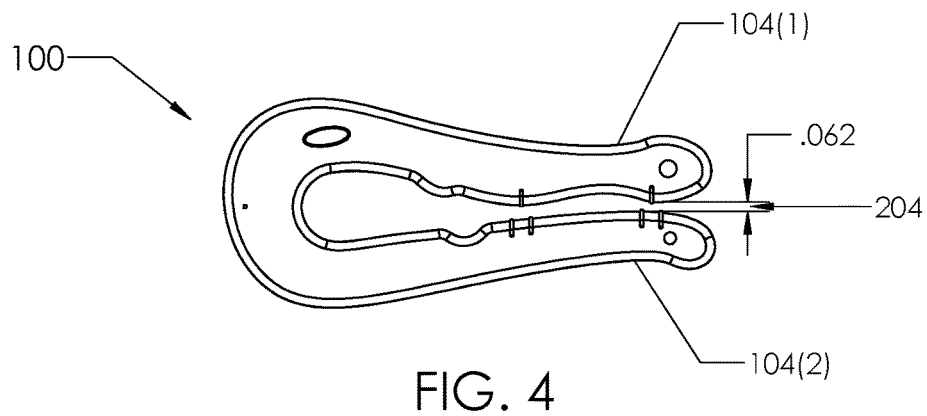
FIG. 4 is a reduced size side view of the dual-clamping-mode clip of FIG. 1, illustrating an example minimum gap.
Figure 8A:
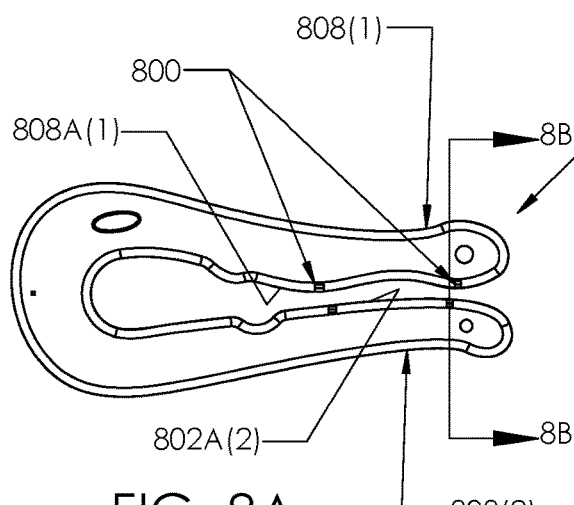
FIG. 8A is a side view of an example dual-clamping-mode clip of the present disclosure, illustrating alternative micro gripping features.
Figure 8B:
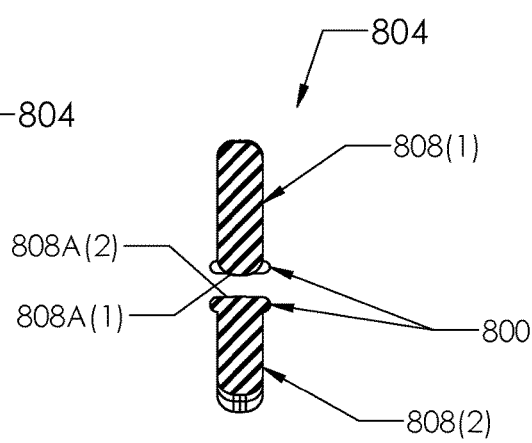
FIG. 8B is a cross-sectional view as taken along line 8B-8B of FIG. 8A.

FIG. 4 illustrate some considerations for determining the minimum gap between the jaws of a dual-clamping-mode clip of the present disclosure, here dual-clamping-mode clip 100. As can be seen from FIG. 4, minimum gap 204 when jaws 104(1) and 104(2) are aligned (vertically in the view shown) with one another in the clamping region 116, here, at the set of confronting gripping areas 124(1) and 124(2) farthest from crotch region 108. It is noted that when a dual-clamping-mode clip of the present disclosure has multiple sets of confronting grip areas, the corresponding gap distances may all be the same as one another or they may differ from one another. In addition, where the gap distances differ, it may be preferable, though not essential, to have the smaller(est) gap distance located at the confronting grip regions farthest from the crotch region. FIG. 4 also provides some illustrative, but non-limiting, dimensions. Here, minimum gap 204 is shown as being 0.062 inches. Consequently, if one or more layers of an article (not shown) inserted into minimum gap 204 has a generally incompressible thickness of greater than 0.062 inches, then jaws 104(1) and 104(2) will act not only in pinching mode (FIG. 2A), but also in scissor-action mode (FIG. 3C). The scissor action is activated for a relatively thick stack of one or more layers due to higher stiffness of dual-clamping-mode clip 100 in pinching relative to the lower stiffness of the dual-clamping-mode clip in the scissor-action. In the configuration shown in FIG. 4 and in one example, dual-clamping-mode clip 100 may be useful in capturing stacks of thickness in a range of 0.060 inches to 0.400 inches. Of course, many other configurations that can capture stacks of many other thicknesses can readily be devised for a dual-clamping-mode clip of the present disclosure.

FIGS. 5A and 6A show two embodiments of dual-clamping-mode clips 500 and 600 of the present disclosure that differ from one another and from the embodiment FIG. 1. It is noted that dual-clamping-mode clips 500 and 600 of FIGS. 5A and 6A do not have clothes-line-engaging features, but they do each have a material relief region 504, 604, which has been found particularly useful for clipping together articles of clothing, especially, but not exclusively, socks. Dual-clamping-mode clips 500 and 600 each have respective example alternatively configured clamping regions 508, 608 to illustrate but two of a wide variety of clamping-region designs that can be made. Those skilled in the art will understand that the clamping regions illustrated throughout the appended drawings are merely illustrative and by no means limiting. It is noted that dual-clamping-mode clips 500 and 600 do not have micro gripping features, but rather have differing macro gripping features 512, 612, respectively. FIGS. 5B and 5C and 6B and 6C illustrate differing examples of cross-sectional profiles of jaws 516(1), 516(2) and 616(1), 616(2). Other cross-sectional profiles are certainly possible.

FIGS. 7A, 7B and 8A, 8B illustrate some example gripping features 700, 800 that can be provided to a dual-clamping-mode clip of the present disclosure, here dual-clamping-mode clips 704 and 804 of FIGS. 7A, 7B and 8A, 8B, respectively. Gripping features 700 and 800 generally need to be small enough to indent into the stack being clamped therebetween and/or use one or more material features, such as ribbing, texture, and friction. In the latter case, the feature(s) may move smoothly in the scissor-action direction but resist much more when a force is applied in the pinching direction. When a dual-clamping-mode clip of the present disclosure is used with an article made of a fabric having ribbing, such as certain types of socks, the gripping features, such as gripping features 700 and 800, may be located to align with such ribbing to further improve the grip. It is noted that such gripping features 700, 800 can be present on confronting surfaces 708A(1), 708A(2) and 808A(1), 808A(2) of the pair of jaws 708(1), 708(2) and 808(1), 808(2) (for pinching action) and/or on one, the other, or both of the lateral sides of each of the jaws (for scissor action). If gripping features 700, 800 are provided only on one side of each jaw 708(1), 708(2) and 808(1), 808(2) for scissor action, they need to be on opposite lateral sides as between the two jaws.

Figure 9A:
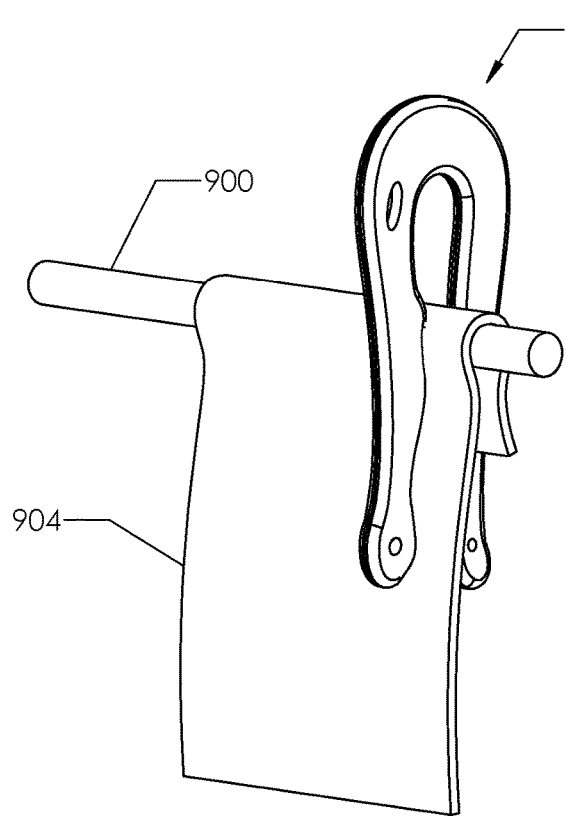
FIG. 9A is an isometric view of the dual-clamping-mode clip of FIG. 1 in use as a clothespin.
Figure 9B:
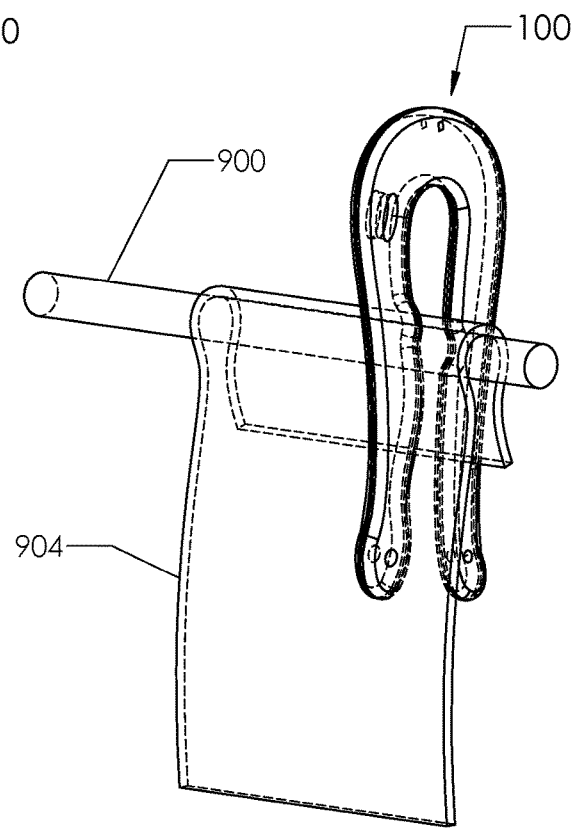
FIG. 9B is the isometric view of FIG. 9A, showing lines hidden from view in FIG. 9A.

FIGS. 9A and 9B illustrate dual-clamping-mode clip 100 of FIG. 1 in use on a clothes line or similar support 900 for clamping an article 904 onto the support. In the example shown in FIGS. 9A and 9B, the combined thickness of support 900 and article 904 wrapped around the support is such that dual-clamping-mode clip 100 is working only in pinching action. However, if this combined thickness were greater, then dual-clamping-mode clip 100 would provide clamping force in scissor action. It is noted that the embodiment shown in FIGS. 9A and 9B could be used only as a clothes pin, if desired.

Figure 10A:
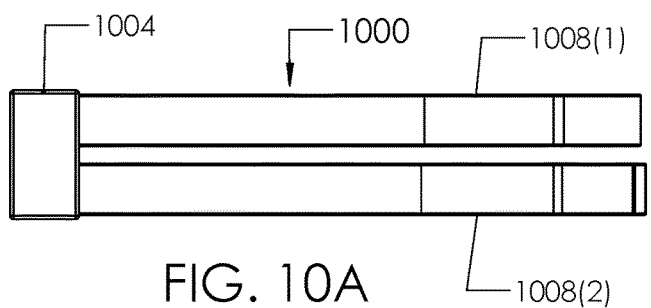
FIG. 10A is a side view of an example dual-clamping-mode clip having a rigid crotch region.
Figure 10B:
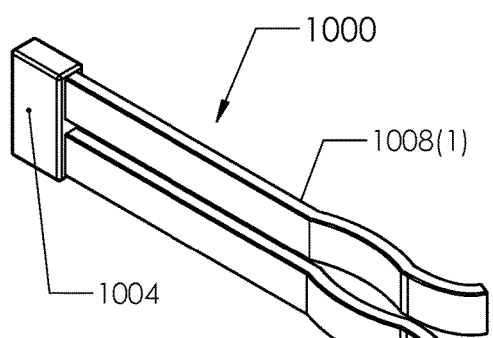
FIG. 10B is an isometric view of the dual-clamping-mode clip of FIG. 10A.
Figure 10C:
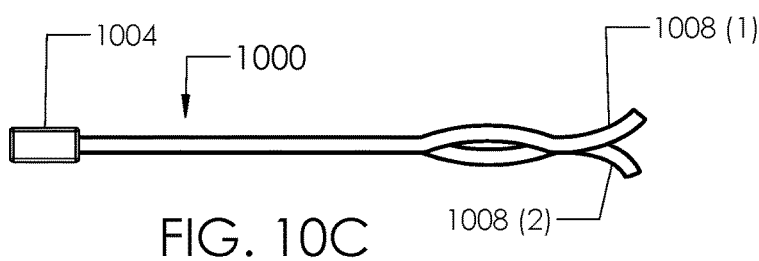
FIG. 10C is a top view of the dual-clamping-mode clip of FIG. 10A.

FIGS. 10A to 10C illustrate an embodiment of a dual-clamping-mode clip 1000 that has an effectively rigid crotch region 1004. In such an embodiment, the scissor action is provided nearly entirely by minor-axis beam bending of the jaws 1008(1) and 1008(2) since the crotch region is too rigid to allow any meaningful torsional deflection at that region.

FIGS. 11A to 11D illustrate an embodiment of a dual-clamping-mode clip 1100 that does not have either a material relief region or any clothesline gripping provisions. Those skilled in the art can readily envision how the constant distance of the gap 1104 along nearly the entire length of jaws 1108(1) and 1108(2) (except at clamping region 1112, which has a narrower gap 1116) would result in not being able to engage the clip fully with a relatively thick article or set of articles. Because of the lack of a material relief region, dual-clamping-mode clip 1100 may be more suitable for use as, for example, a food-bag clip.

Figure 11A:
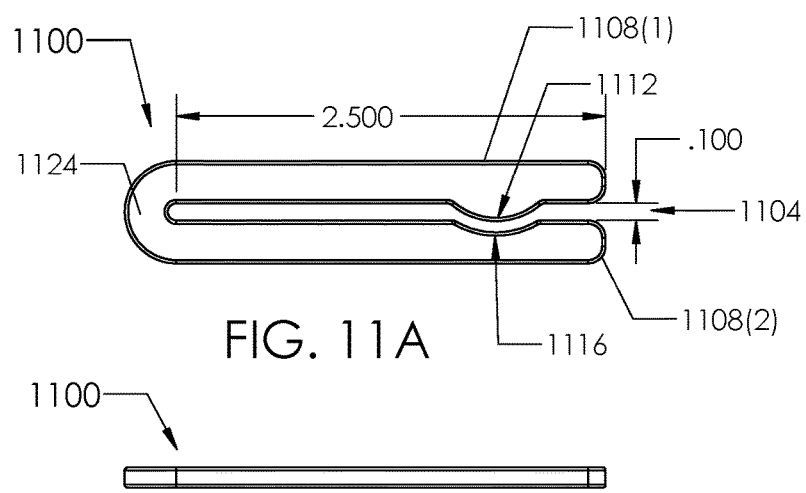
FIG. 11A is a side view of another example dual-clamping-mode clip made in accordance with aspects of the present invention.
Figure 11C:
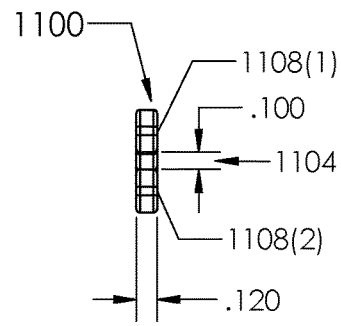
FIG. 11C is an end view of the dual-clamping-mode clip of FIG. 11A.
Figure 11B:
FIG. 11B is a top view of the dual-clamping-mode clip of FIG. 11A.
Figure 11D:
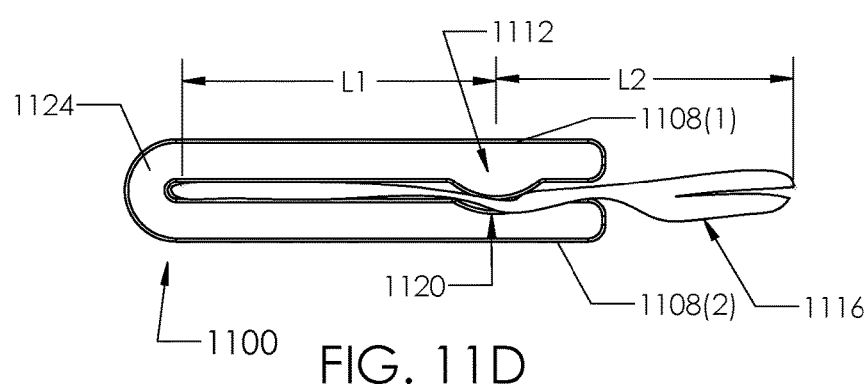
FIG. 11D is the side view of FIG. 11A, further including a pair of socks clamped together by the dual-clamping-mode clip.

FIG. 11D illustrates a dimensional relationship for dual-clamping-mode clip 1100 configured for one or more articles of clothing, here socks 1116, having a particular width. In this example, clamping region 1112 is envisioned as a friction/grip fulcrum 1120 of sorts, and to aid in keeping the socks engaged with dual-clamping-mode clip 1100, the length L1 from the crotch region 1124 to the fulcrum is desired to be greater than the length L2 from the fulcrum to the edge 1104A of socks 1116 farthest from the crotch region. If the friction at clamping region 1112 is ever overcome, having more of the width (L1+L2) of sock 1116 between crotch region 1124 and fulcrum 1120 than beyond the fulcrum tends to keep the socks engaged in dual-clamping-mode clip 1100. Providing a generously sized material relief region (see, e.g., material relief region 112 of dual-clamping-mode clip 100 of FIG. 1) is important, so this favorable case is even more likely.

In one embodiment, a dual-clamping-mode clip of the present disclosure is designed and configured to effectively hold thin and thick socks by means of its sideways motion clamping, or scissor action, and vertical clamping action, or pinching action. This unique design provides a force ample to hold a pair of socks together through clothes washer and dryer cycles, provided that the clip is made from a high temperature material, such as ABS plastic or nylon. In some instantiations, this "sock clip" embodiment of a dual-clamping-mode clip includes a gripping surface that wraps around to the lateral sides of one jaw or each of the jaws in the clamping region, and due to the scissor action, that prevents the socks from sliding out of the clip. Each horizontal gripping surface can be large or small, and can even be an overmold that is a softer durometer material with more gripping (friction on a softer surface), since the gripping power comes from the closed end. The scissor action and the relatively long jaws of some embodiments of a dual-clamping-mode clip of the present disclosure mean that the activation force is low. In other words, it's so easy to use, a six-year-old child is strong enough to use the clip. The sideways action may not be apparent to users; it is somewhat intuitive to some, but instructions may be necessary for others.

It is noted that dual-clamping-mode clips of the present disclosure can be provided to users individually or in sets, such as by selling them to the users. The providing of the dual-clamping-mode clips can be accompanied by instructions for using the clips and/or information about how they work to achieve their dual-clamping-mode modes and/or other functionality such as a clothes-pin functionality. Such instructions can be via instructive diagrams and/or verbal instructions, as can be the other information about how they work. Such other information can, for example, be diagrams that show a dual-clamping-mode clip deployed in a pinching-action mode and in a scissor-action mode and/or as a clothes pin.

Regarding materials of construction, a dual-clamping-mode clip made in accordance with the present disclosure can be made of any suitable material that provides the functionalities described herein. When such a clip is used as a laundry clip that will be exposed to a clothes dryer, the clip may be made, for example, of a plastic suitable for withstanding repeated use in the hot environment of the clothes dryer without losing its ability to remain clamped to the article(s) of clothing. Generally, the temperature inside a clothes dryer ranges from about 120° F. on a low-heat setting to 175° F. or more on a high-heat setting. Those skilled in the art of plastics would be able to determine a suitable type of plastic for such heated environments.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Example embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A clip for clamping together a stack of multiple layers, the stack having a thickness and the clip comprising:
   a body generally having a U shape and that includes:
   first and second elongate jaws forming legs of the U-shape, each of the first and second elongate jaws having:
   first and second lateral sides;
   a confronting face extending from the first lateral side to the second lateral side, wherein the confronting faces confront one another when the stack is not present; and
   a clamping region, wherein the clamping regions of the corresponding respective first and second elongate jaws are designed and configured to simultaneously contact corresponding opposing outer faces of the multiple layers so as to clamp the multiple layers together, each clamping region having a clamping surface on at least a portion of the confronting face and extending onto one, the other, or both, of the first and second lateral sides; and
   a crotch portion joining together the first and second elongate jaws and located distal from the clamping regions of the first and second elongate jaws so as to form a base of the U shape;
   wherein the body is designed and configured to accommodate differing stack thicknesses by:
   when the thickness of the stack is below a threshold thickness and the stack is clamped in the clamping regions of the first and second elongate jaws, the first and second elongate jaws holding the stack by a pinching action that the clip applies in a pinching-action direction; and when the thickness of the stack is above the threshold thickness and the stack is clamped in the clamping regions of the first and second jaws, the first and second elongate jaws deflecting by a scissor action in a scissor-action direction different from the pinching-action direction.

2. The clip according to claim 1, wherein the crotch portion is torsionally flexible so as to contribute to the scissor action.

3. The clip according to claim 1, wherein the crotch portion is torsionally rigid so that the scissor action results substantially from lateral bending of at least one of the first and second jaws.

4. The clip according to claim 1, wherein the clamping regions of the first and second elongate jaws are spaced from one another.

5. The clip according to claim 1, wherein each of the first and second elongate jaws and the crotch portion have an I-shaped transverse cross section with a central region and flange regions on opposing ends of the central region.

6. The clip according to claim 1, wherein each of the first and second elongate jaws and the crotch portion have a substantially rectangular transverse cross section.

7. The clip according to claim 1, wherein at least one of the clamping surfaces has gripping features.

8. The clip according to claim 7, wherein the gripping features are present on at least one of the first and second lateral sides so as to hold the stack when the first and second elongate jaws are working via scissor action.

9. The clip according to claim 7, wherein the gripping features are present on one of the first and second lateral sides but not the other one of the first and second lateral sides.

10. The clip according to claim 7, wherein the gripping features are present on both of the first and second lateral sides.

11. The clip according to claim 1, wherein the first and second elongate jaws define an open space proximate to the crotch portion.

12. The clip according to claim 1, wherein the body has an overall length of about 2.5 inches to about 3.5 inches.

13. The clip according to claim 1, wherein the body is a monolithic body.

14. The clip according to claim 13, wherein the body is a plastic injection molding.

15. The clip according to claim 14, wherein substantially all of the body is made of a first material and at least one of the clamping regions is formed by overmolding a second material onto the first material, wherein the second material has a lower durometer value than the first material.

16. The clip according to claim 13, wherein the body is machined from a solid body of plastic.

17. The clip according to claim 13, wherein the body comprises a plastic capable of withstanding heat inside a clothes dryer during use such that the C-shaped body does not deform and remains clamped to the stack during drying in the clothes dryer.

18. The clip according to claim 1, wherein at least one of the confronting faces has at least two points of reverse curvature.

19. The clip according to claim 1, wherein each of the first and second elongate jaws has a free end, wherein the free ends have contoured clip-installation surfaces that confront one another and are designed and configured to increase the compressive load the clip applies to the stack as the clip is advanced onto the stack.

20. The clip according to claim 19, wherein each of the contoured clip-installation surfaces is designed and configured to induce scissor-action movement into the clip when the stack is thicker than a predetermined thickness.

21. The clip according to claim 1, further comprising a material relief region between the crotch portion and the clamping region.

22. The clip according to claim 21, wherein the stack has a maximum design thickness and the material relief region has a gap between the first and second jaws that is greater than the maximum design thickness.

23. The clip according to claim 21, wherein the body has:
a minimum gap between the first and second jaws at the clamping region; and
a gap between the first and second jaws at the material relief region that is greater than the minimum gap.

24. A method, comprising:
providing the clip of claim 1; and
providing instructions on how to use the clip, wherein the providing of instructions includes providing instructions on utilizing the scissor-action for clamping the stack.

25. The method according to claim 24, wherein the providing of instructions on utilizing the scissor action includes providing instructions on using the scissor-action when the stack has a relatively large thickness.

26. The method according to claim 24, wherein the providing of instructions on how to use the clip further includes providing instructions for clipping a pair of socks together and using the clip in a clothes washer and a clothes dryer.

27. The method according to claim 26, wherein the providing of instructions on how to use the clip further includes providing instructions for using the clip as a clothes pin to hang and article of clothing on a clothes line.

* * * * *